United States Patent
Richter

(10) Patent No.: US 8,016,251 B2
(45) Date of Patent: Sep. 13, 2011

(54) APPARATUS SUPPORT CONSOLE WITH ADJUSTABLE SUPPORT PLATE

(76) Inventor: Harald Richter, Engelbrand (DE)

(*) Notice: Subject to any disclaimer, the term of this patent is extended or adjusted under 35 U.S.C. 154(b) by 0 days.

(21) Appl. No.: 12/658,577

(22) Filed: Feb. 5, 2010

(65) Prior Publication Data
US 2010/0140424 A1 Jun. 10, 2010

Related U.S. Application Data

(62) Division of application No. 11/046,646, filed on Jan. 28, 2005, now Pat. No. 7,731,135.

(30) Foreign Application Priority Data

Nov. 29, 2004 (DE) .................. 20 2004 018 511 U

(51) Int. Cl.
*E04G 3/00* (2006.01)
(52) U.S. Cl. .............. 248/125.9; 248/125.1; 248/371; 248/157; 403/105
(58) Field of Classification Search ........... 248/276.1, 248/278.1, 281.11, 284.1, 286.1, 354.1; 403/105, 403/107
See application file for complete search history.

(56) References Cited

U.S. PATENT DOCUMENTS

| | | | | |
|---|---|---|---|---|
| 6,478,275 B1* | 11/2002 | Huang | | 248/284.1 |
| 6,769,657 B1* | 8/2004 | Huang | | 248/278.1 |
| 7,419,347 B1* | 9/2008 | Cormier | | 414/462 |
| 7,424,991 B2* | 9/2008 | Kim et al. | | 248/125.9 |
| 7,513,473 B2* | 4/2009 | Lu et al. | | 248/276.1 |
| 2005/0121578 A1* | 6/2005 | Asamarai et al. | | 248/284.1 |
| 2007/0102607 A1* | 5/2007 | Koh | | 248/276.1 |

* cited by examiner

*Primary Examiner* — Terrell McKinnon
*Assistant Examiner* — Steven Marsh
(74) *Attorney, Agent, or Firm* — Klaus J. Bach

(57) ABSTRACT

In an apparatus support console comprising a pedestal having a foot, a support column extending from the foot and pivot joint structures supported on the column and carrying an apparatus or an apparatus holder, a telescopic member is pivotally supported on the column that is between the pivot joint structures so as to be extendable or retractable and the telescopic structure is provided with locking means for locking the telescopic member to permit secure positioning of the apparatus and locking it in any position convenient to a user of an apparatus supported by the support console.

7 Claims, 8 Drawing Sheets

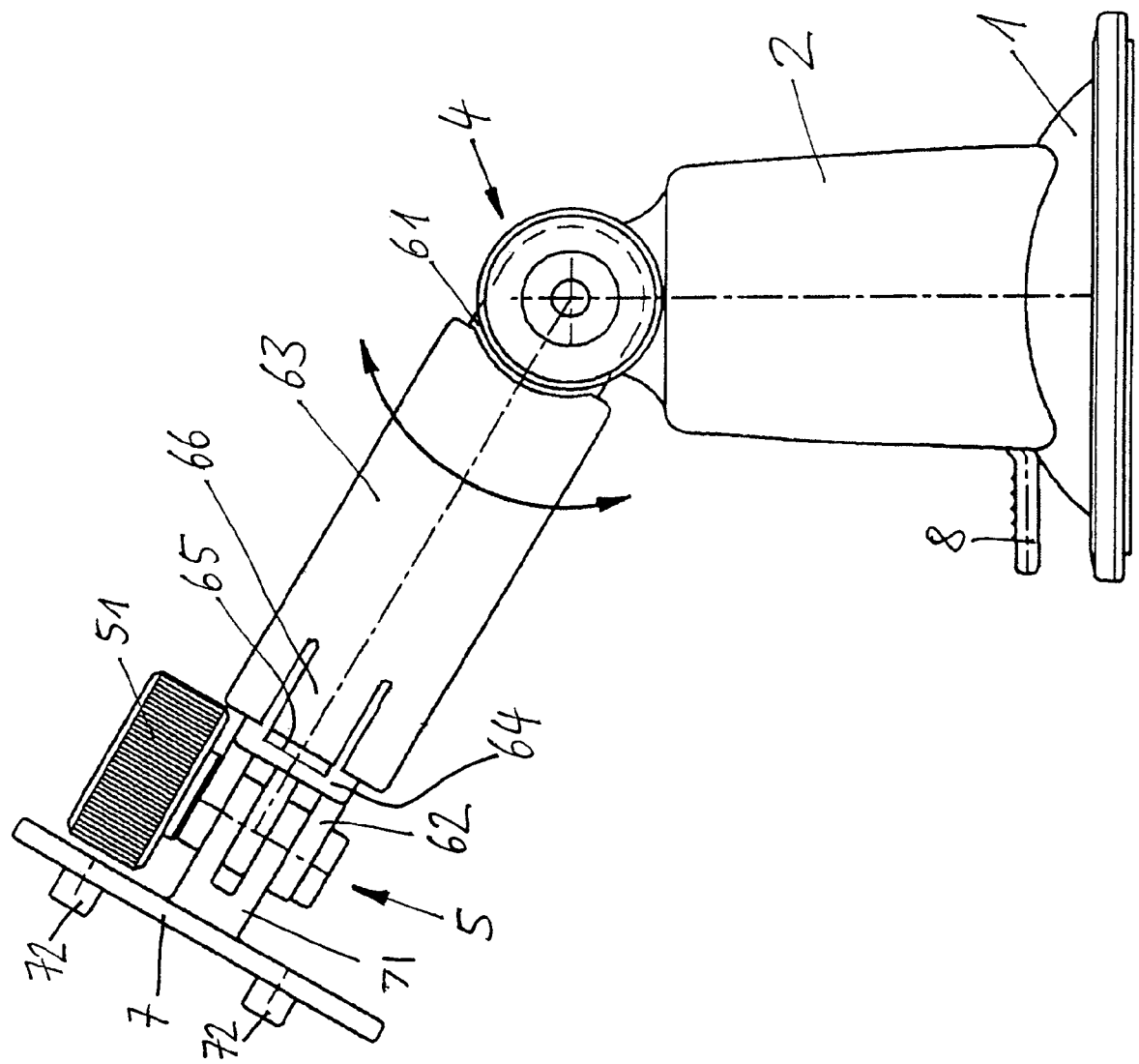

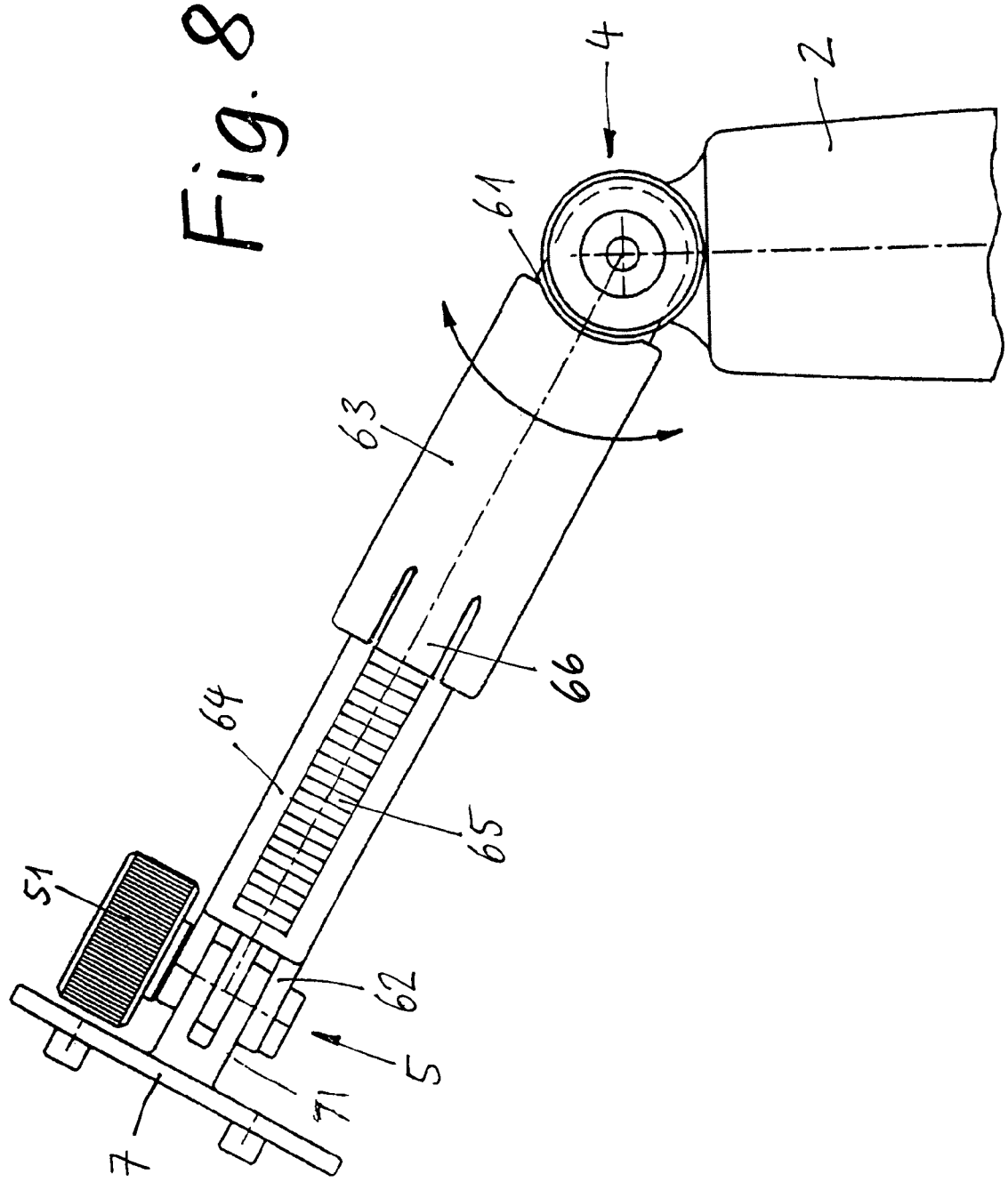

APPARATUS SUPPORT CONSOLE WITH ADJUSTABLE SUPPORT PLATE

This is a Divisional Application of application Ser. No. 11/046,646 filed Jan. 28, 2005 now U.S. Pat. No. 7,731,135.

BACKGROUND OF THE INVENTION

The invention resides in an apparatus support console with an adjustable support plate for the variable or respectively adjustable support of small apparatus such as minicomputers as they are generally known under the designation "PDA" (Personal Digital Assistant), mobile navigation devices, cell phones and similar devices.

Such apparatus support consoles are used particularly in motor vehicles to support apparatus of the type referred to above on the Windshield, the dashboard, a center console, or other parts in an orientation which is comfortable for the user of the apparatus and which is adjustable depending on the spatial relation of the user and the mounting location of the support console.

U.S. patent application Ser. No. 10/902,533 discloses an apparatus support console comprising a column which is provided at one end with a foot and carries at the opposite end, via a lockable pivot joint, a pivotable support plate provided with an engagement structure for the lockable mounting of an apparatus or an apparatus holder. The foot includes a suction structure and the column is hollow and includes, within, an operating mechanism for a suction structure of which only an operating lever extends sidewardly through an opening in the hollow column.

It is the object of the present invention to provide an improved apparatus support console particularly one which provides for a more universal adjustability for the support plate.

SUMMARY OF THE INVENTION

In an apparatus support console comprising a pedestal having a foot and a support column extending from the foot and pivot joint structures supported on the column and carrying an apparatus or an apparatus holder, a telescopic member is longitudinally movably supported on the column so as to be extendable from, and retractable toward, the column and locking means are provided for locking the telescopic member relative to the column to permit positioning the apparatus and locking it in any position convenient to a user of the apparatus support console.

In a particular embodiment, the support console according to the invention comprises a building set including two or more different exchangeable intermediate members of different length as connecting pieces between pivot joints and form-fitting locking elements for a rotational locking of a selected pivot position so that the apparatus or the apparatus support plate can be firmly locked in a multitude of positions which permits optimal adaptation of the apparatus support console to the given spatial conditions and safely locks the selected set-up for the apparatus being supported so that it will remain in the selected position even with strong vibrations as they occur in vehicles when driving over bumpy roads.

An embodiment of the invention will be described below on the basis of the accompanying drawings.

BRIEF DESCRIPTION OF THE DRAWINGS

FIG. 7 shows another embodiment of the invention wherein the connecting member between the pivot joints is in the form of a telescopic structure, and FIG. 8, shows the arrangement of FIG. 7 with the telescopic structure extended.

DESCRIPTION OF A PREFERRED EMBODIMENT

Figure 1:
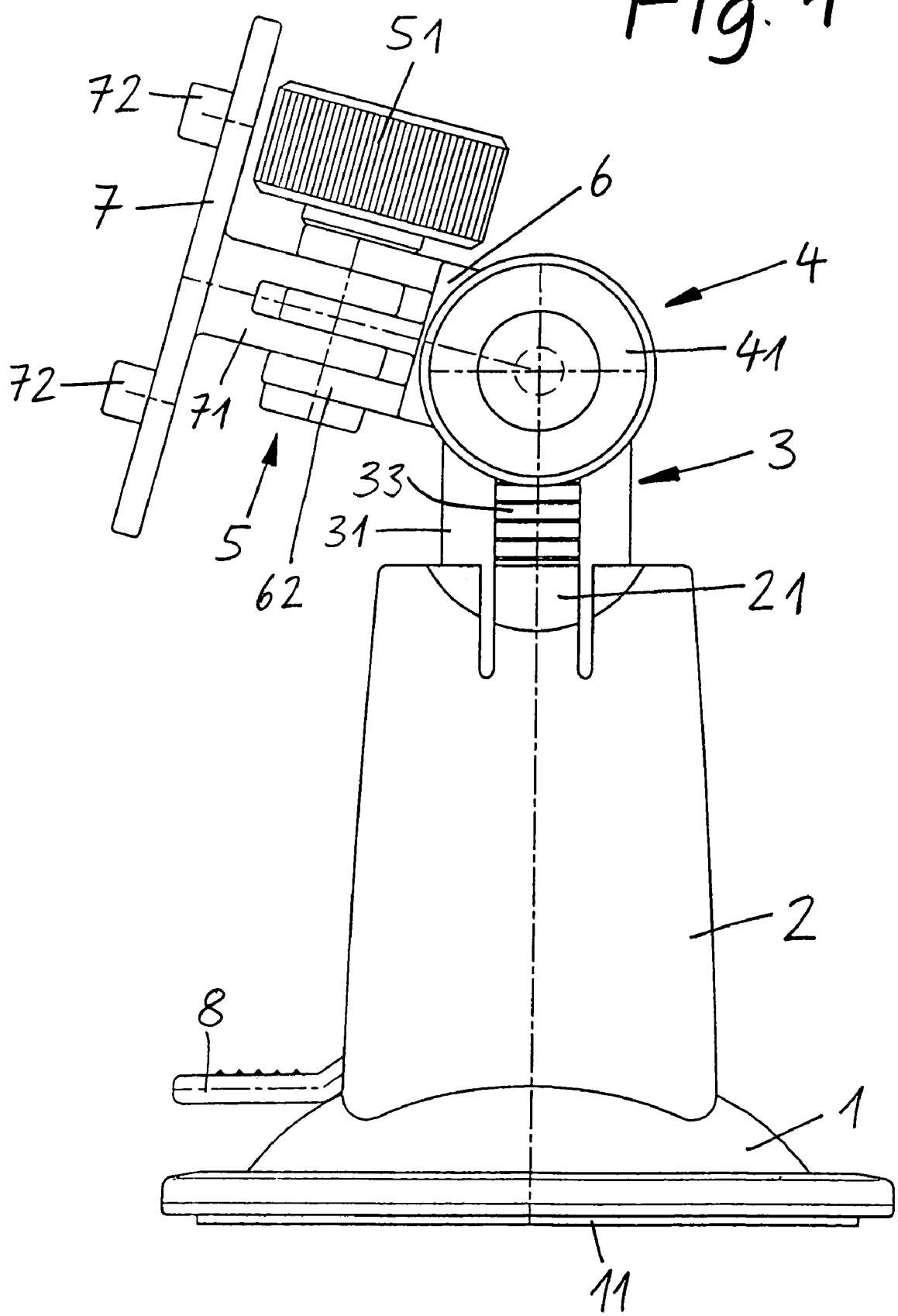
FIG. 1 is a side view of the apparatus support console according to the invention.

The apparatus support console comprises a foot 1, a column 2 extending upwardly from the foot 1, a telescopic member 3 slidably supported in the column 2, a first lockable pivot joint mechanism 4 disposed on top of the telescopic member 3, a second lockable pivot joint mechanism 5 having a pivot axis extending in a plane normal to the pivot axis of the first pivot joint mechanism 4, an intermediate member 6 extending between, and joining, the pivot joint mechanisms 4 and 5 and a support plate 7 for the releasable engagement of an apparatus or an apparatus support structure. The support plate 7 is connected to the column 2 by way of an adjustment structure which comprises the two pivot joint mechanisms 4 and 5, the intermediate member 6 and the telescopic member 3. In this way, the position of the support plate 7 can be adjusted by selective pivoting about the two axes of the pivot joint mechanisms 4 and 5 and by changing the height over the foot 1 via the telescopic member 3. The components of the support console consist all essentially of plastic material.

The foot 1 is in the form of a membrane vacuum attachment structure as it is disclosed in Applicants co-pending application Ser. No. 10/902,533. In the figures, the suction membrane 11 can be seen just below the bottom flange of the pedestal comprising the foot 1 and the column 2. The suction membrane 11 is connected to an operating mechanism which is arranged in the interior of the hollow column 2 for example corresponding to the operating mechanism as shown in the above co-pending application but which may be different as it is not part of the present invention.

In the drawings only the operating lever 8 of the suction membrane operating mechanism is visible for operating the mechanism between a vacuum engagement and a release position. The lower position of the operating lever as shown in FIG. 8 corresponds to the vacuum engagement position of the membrane 11 wherein the membrane is pulled upwardly in the center thereof to generate a vacuum force engaging the pedestal foot 1 with a smooth surface on which the foot 1 is disposed.

Figure 3:
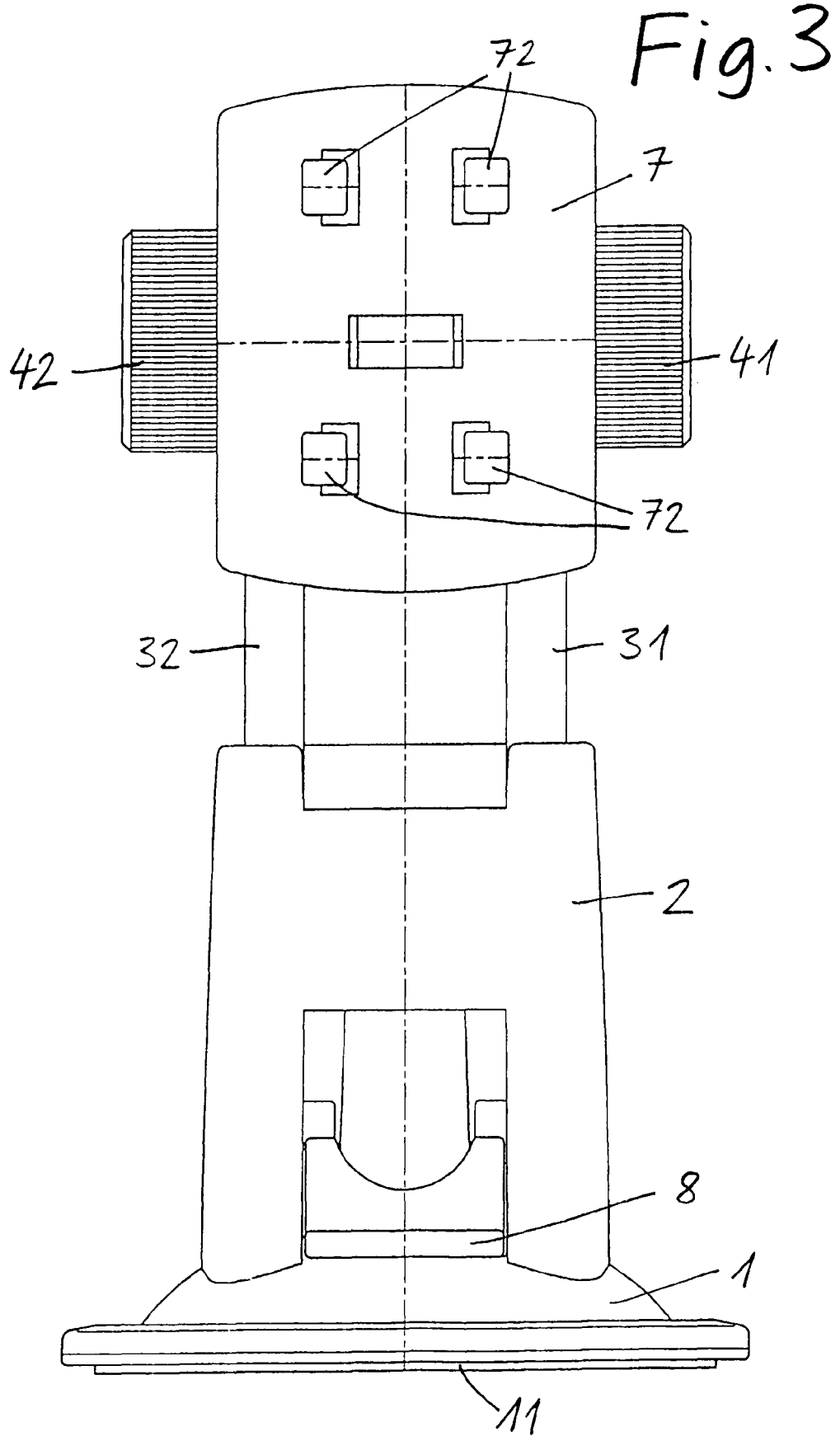
FIG. 3 is a front view of the apparatus support console in the position of FIG. 2.
Figure 4:
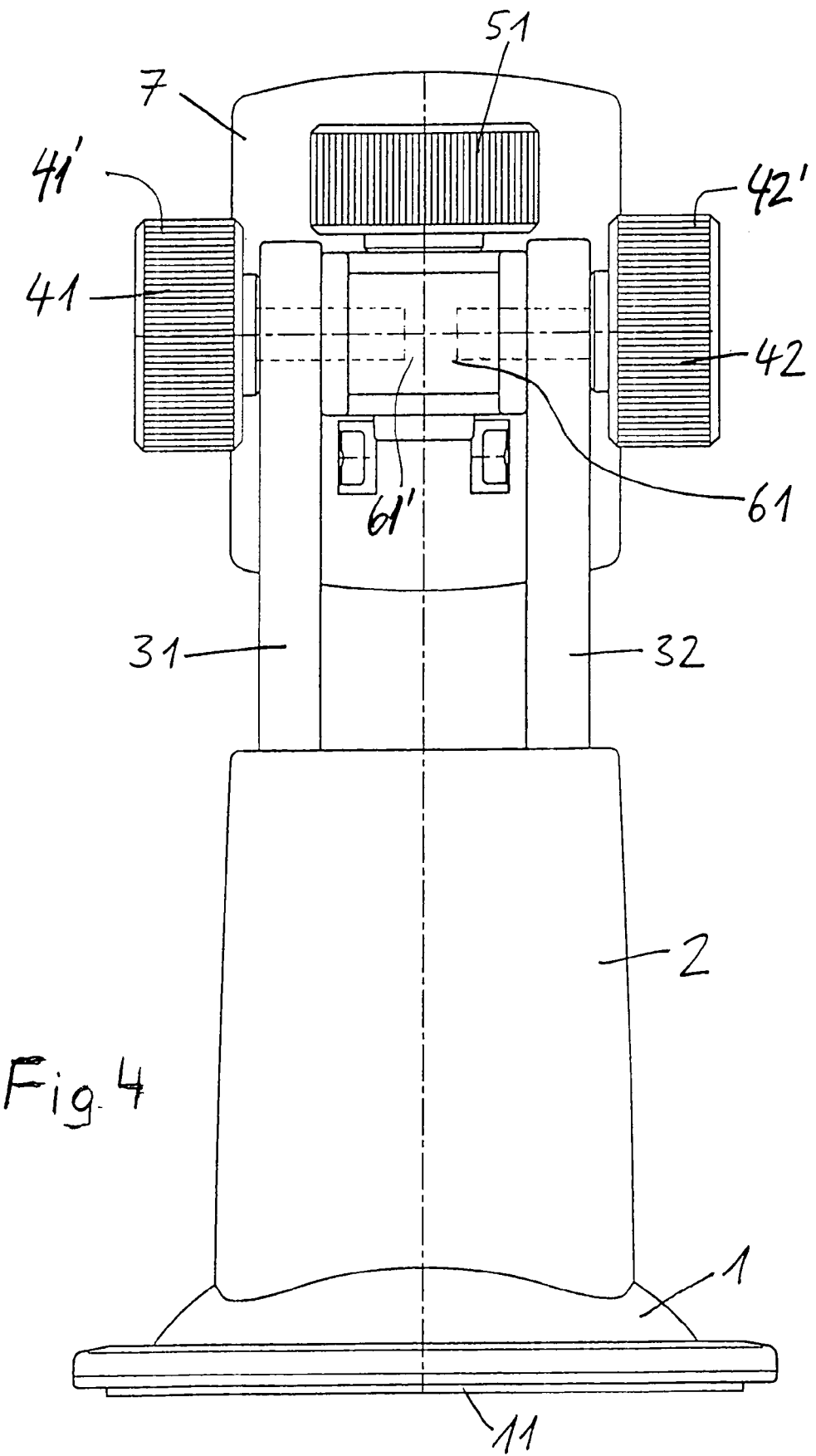
FIG. 4 is a rear view of the apparatus support console in the position of FIG. 2.
Figure 5:
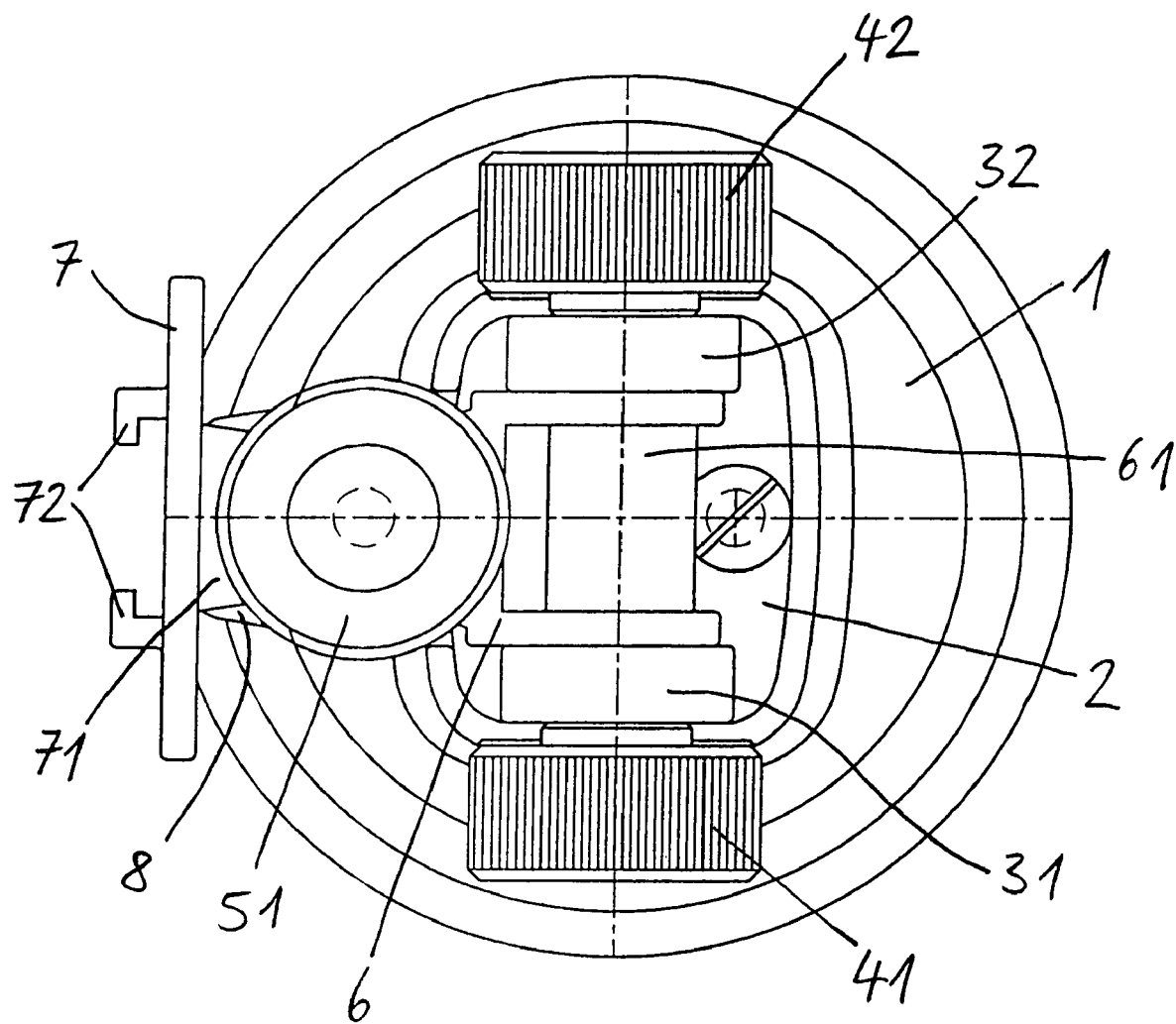
FIG. 5 is a top view of the apparatus support console in the position of FIG. 2.

In the column 2, the telescopic member 3 is slidably supported via two parallel telescope track sections 31, 32 (FIGS. 3, 4 and 5) which are guided in the column 4 and provided at their outer sides with a toothed rack structure 33 which is engaged by a resilient latch member 21 formed integrally with the column 2 at the upper end thereof. The spring engagement force of the latch member 21 is so selected that, with an appropriate force, the telescope member 3 can be moved longitudinally into, or out of, the column 2 by overcoming the retaining force of the resilient latch member 21. In the selected position, the telescopic member 3 is locked by the resilient latch member 21 arranged at opposite sides of the column 2 by engagement of the latch members 21 with the respective toothed rack structures 33.

The first pivot structure 4 comprises two bolts 41, 42 with knurled operating heads 41', 42' and threaded shafts 41", 42". which extend through openings in the upper ends of the telescope tracks 31, 32 and are screwed into a threaded bore 61' in one end sleeve 61 of the intermediate member 6. By tightening the bolts 41, 42, the end sleeve 61 is firmly engaged with the respective telescopic tracks 31, 32, whereby the pivot joint structure 4 is firmly locked by frictional engagement.

It is also possible to provide at the axial end faces of the end sleeve 61 and the respective inside faces of the telescope tracks 31, 32 radial tooth profiles, which provide for a form-locking arrangement for the pivot joint mechanism when the bolts 41, 42 are tightened.

The second pivot joint mechanism 5 comprises a forked end structure 62 at the opposite end of the intermediate member 6 with three spaced prongs and a bolt 51 with a knurled operating head 52 and a two-pronged connecting member 71 extending into the gaps between the three spaced prongs of the intermediate member 6. The bolt 51 has a shaft 53, which extends through bores in the prongs 71 of the connecting member and the forked end structure 62 and is threaded into a thickened area at the side of the forked end structure 62 opposite the head 52 of the bolt 51. Expediently, the thickened area is formed by a metal nut 54 which is received in the forked end structure 62.

When tightening the bolt 51, the interlocked prongs of the forked end structure 62 and the prongs 71 of the support plate 7 are pressed together so that the pivot joint structure 5 is interlocked by frictional engagement in the respective selected pivot position of the support plate 7. Of course, also in this pivot joint structure, additionally a form-locking engagement can be provided in the same way as in the pivot joint structure 4 may be provided, but, with the very short lever arm between the axis of the pivot joint structure 5 and the support plate 7 this should normally not be necessary especially since the moment effective on the pivot joint structure 5 by any apparatus supported on the support plate 7 is normally in a plane extending along the axis of the joint 5.

The support plate 7 is provided at the front side thereof with an arrangement of four L-shaped retaining claws for engaging an apparatus support device for holding an apparatus of the type mentioned initially or for directly engaging such an apparatus with the support plate 7.

The retaining claws 72 extend into corresponding complementary slots in the bottom of the apparatus holder or the apparatus where they are received and locked in position. In this way, they form with the slots of the apparatus holder or the apparatus itself a rapid locking mechanism so that the apparatus holder or, respectively, the apparatus can be rapidly installed or removed.

Figure 2:
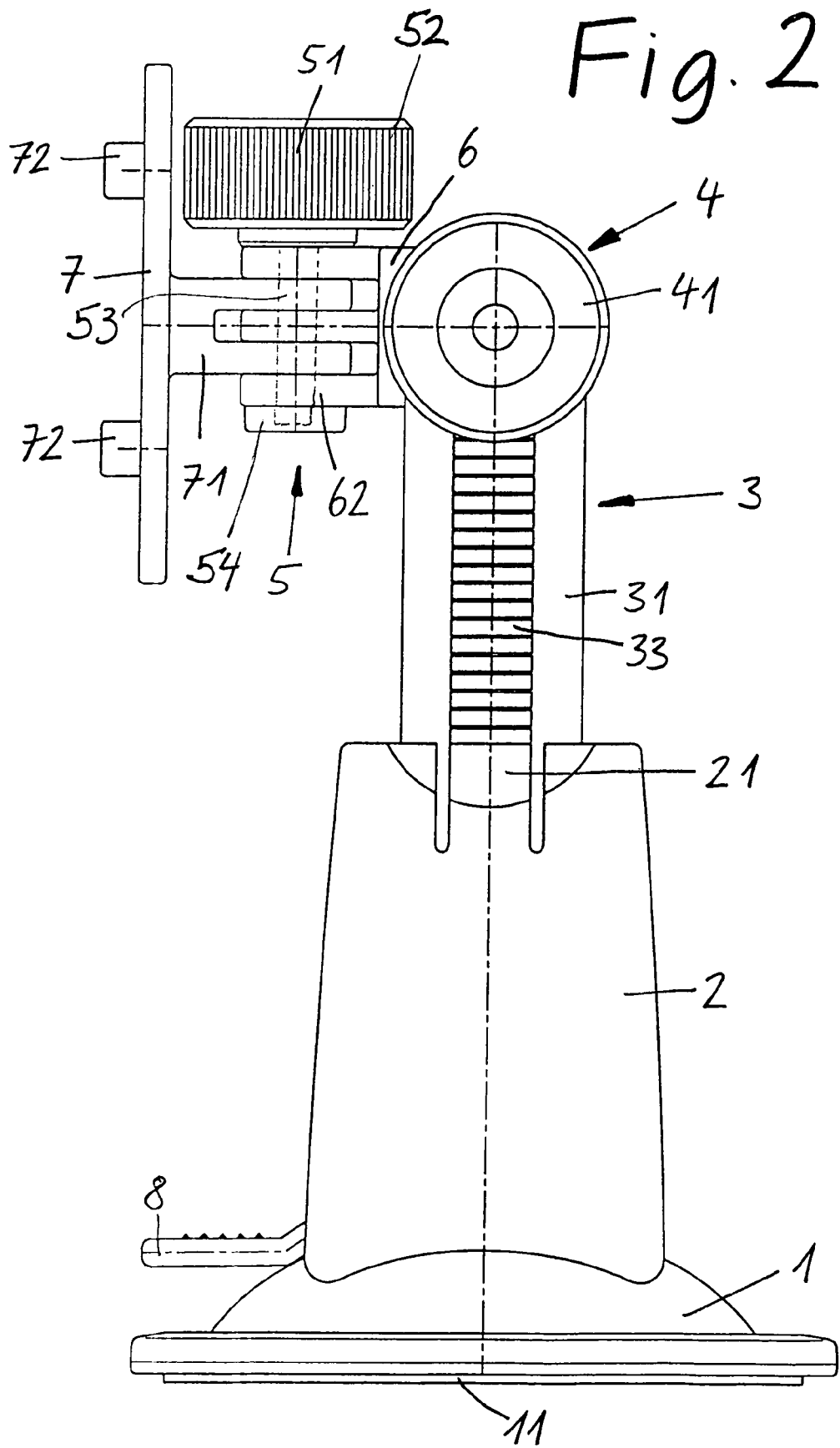
FIG. 2 is a side view of the apparatus support console similar to FIG. 1 wherein however the position of the support plate is changed.
Figure 6:
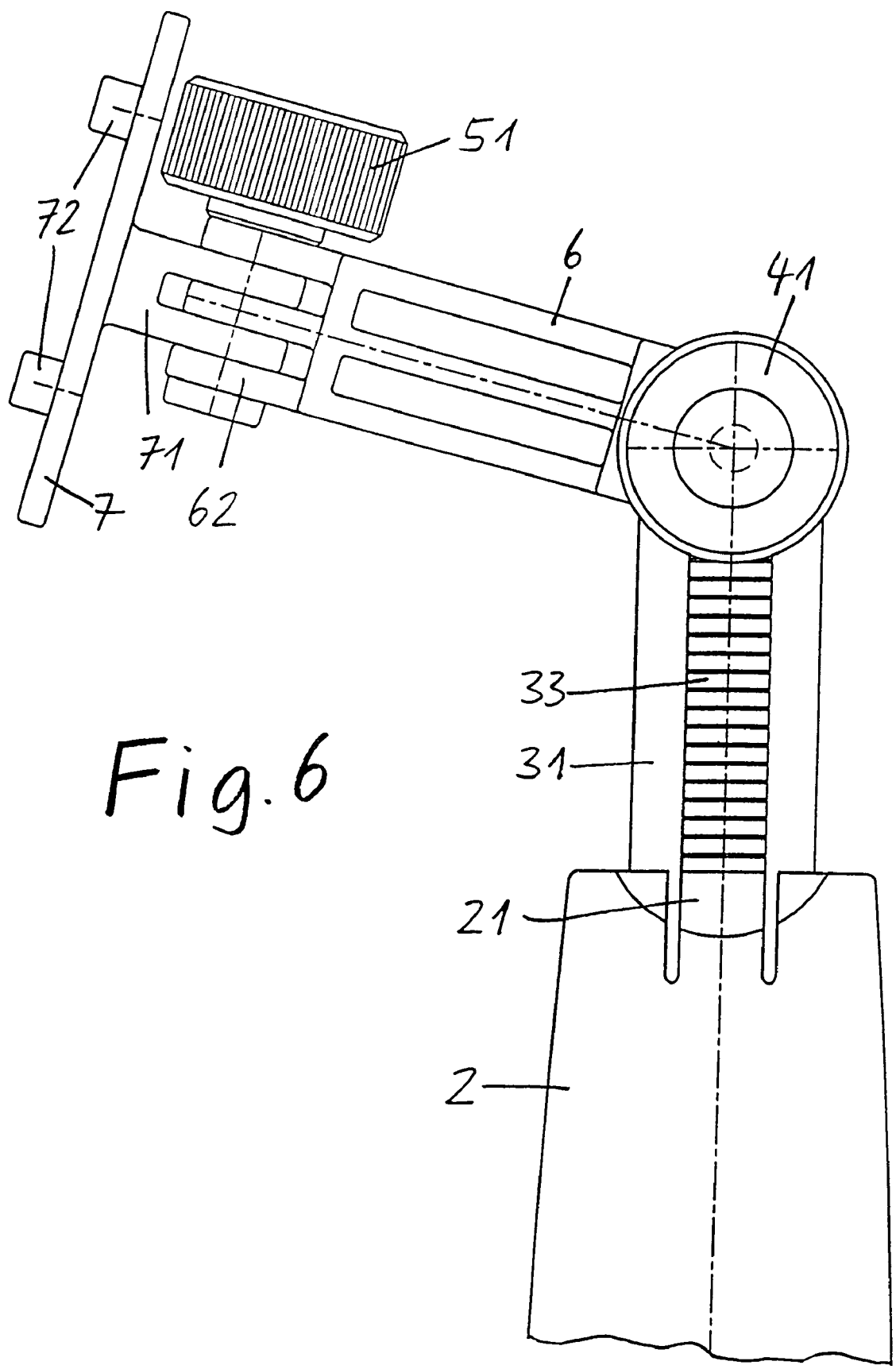
FIG. 6 is a side view of the apparatus support console with a different, that is, a longer intermediate member between the pivot joints than that shown in FIG. 1.

FIG. 6 shows the apparatus support console in the same side view as it is shown in FIG. 2, only the arrangement is slightly changed. The intermediate member 6 between the two pivot joint structures 4 and 5 is substantially longer with the support console of FIG. 6 than it is for the support console of FIG. 2 and the pivot position of the intermediate member 6 is slightly changed from that shown in FIG. 2 to the pivot position as shown in FIG. 1.

In the arrangement according to the invention, the intermediate member 6 is easily exchangeable. It is only necessary to remove the two bolts 41, 42 of the pivot joint structure 4 and the bolt 51 of the pivot joint structure 5 to take the connecting member 71 of the support plate 7 out of the forked end piece 62 of the intermediate member 6 and the intermediate member 6 with the end sleeve 61 out of its position between the ends of the telescope tracks 31, 32. The installation of the intermediate member 6 is just as simple. Preferably, the apparatus support console is supplied with two or even three intermediate members 6 of different length, so that the user can select an intermediate member 6 and install it between the two pivot joint structures 4, 5 for obtaining a position of the support plate 7 in which the apparatus supported on the support plate 7 is located at a Convenient distance from the user. It is noted that the intermediate member 6 may also be in the form of a telescopic arm, but exchangeable intermediate members of different length are inexpensive and provide for better stability so that, at this point, such a solution is preferred.

FIGS. 7 and 8 show an alternative embodiment of the apparatus support console shown in FIGS. 1 to 6. The difference resides in the arrangement wherein the intermediate member 6 is in the form of a telescopic member rather than the column 2. the intermediate member in this arrangement comprises a telescopic element 63 supported pivotally at one end by the pivot joint structure 4 and connected at its opposite end with its telescopically movable member 64 to the pivot joint structure 5.

As shown in FIG. 6 for the column 2 there is an engagement structure provided between the telescopic elements 63, 64 with a toothed rod structure 65 disposed at opposite sides of the telescopic element 64. Latch members 66 are provided on the telescopic element 63 for firmly engaging the telescopically movable element 64 with the telescopic support element 63 in any chosen position, in which the telescopic elements are engaged with each other with high stability and freedom from vibrations even in an extended state.

In the embodiment as shown in FIGS. 7 and 8, the pivot joint structure 4 is firmly connected to the column 2. But it is to be understood that also other combinations of the two embodiments are possible: Telescopic structures may be provided in both, the column 2 as shown in FIGS. 1-6 as well as in the intermediate member disposed between the pivot joint structures as shown in FIGS. 7 and 8. Such an arrangement may be preferable for example for vehicles with windshields which are moved forwardly in order to permit a convenient position adjustment of the device supported by the support plate 7 of the apparatus support console.

Although the embodiments shown in the drawings and described herein appear to be an optimal solutions as far as adjustability, stability, and vibration insensitivity is concerned, also modified embodiments are possible. For example, the intermediate member 6 could carry at its free end, instead of the pivot joint structure 5, a ball joint structure permitting a universal adjustment of the support plate 7 or a ball joint structure could also be provided at the top of the telescopic member 3 for the universal positioning of the support plate 7 directly at the top end of the telescopic member 3 whereby both orthogonally oriented pivot joint structures 4 and 5 and the intermediate member therebetween could be replaced.

What is claimed is:

1. An apparatus support console comprising a pedestal having a foot (1), a support element (2) extending from the foot (1), a first pivot joint structure (4), supported by the support element (2) and pivotally supporting a support arm (63) carrying a second pivot joint structure (5) pivotally supporting an apparatus or apparatus support plate (7), the support arm (63) comprising a telescopic structure (63, 64) including two extendable members (64) longitudinally slidably supported in spaced relationship within the support arm (63), each extendable member (64) comprising a toothed rack structure (65) with a resilient latch member (66) provided on the support arm (63) for each toothed rack structure (65), the toothed rack structures (65) and the resilient latch members (66) forming ratchet structures providing for a retaining force permitting movement of the extendable members (64) when a force exceeding the retaining force provided by the resilient latch members (66) is applied to the extendable members (64) whereby each latch member (66) is tilted outwardly while the extendable members (64) are moved longitudinally into, or out of, the support arm (63) and the latch members (66) are reengaged with the toothed rack structures for locking the extendable members (64) in a desired position in the support arm (63).

2. An apparatus support console according to claim 1, wherein the pivot joint structures include pivot joints (4, 5) whose axes extend in planes which are disposed normal to each other and which are interconnected by the support arm (63).

3. An apparatus support console according to claim 2, wherein each pivot joint (4, 5) is provided with at least one clamping bolt (41, 42, 51) for locking the pivot joints in a selected pivot position.

4. An apparatus support console according to claim 1, wherein the support arm (63) includes an end attached to the first pivot joint structure (4) with a sleeve (61) into which clamping bolts (41, 42) are threaded.

5. An apparatus support console according to claim 4, wherein a second pivot joint formed at the opposite end of the support arm (63) comprises a forked end structure (62) and forked connecting piece having interlocked prongs through which a clamping bolt (51) extends.

6. An apparatus support console according to claim 1, wherein the foot (1) comprises a suction means including a suction membrane (11) supported in the foot (1) and a membrane operating mechanism is arranged in the column (2) with an operating lever (8) extending from the support element (2) so as to be movable between ineffective and effective positions.

7. An apparatus support console according to claim 1, wherein the support plate (7) is provided with an array of retaining claws (72) which have an L-shaped cross-section for engagement in corresponding complementary openings in the apparatus or the apparatus support plate (7).

* * * * *